United States Patent
Mirizzi

(10) Patent No.: US 12,475,146 B2
(45) Date of Patent: Nov. 18, 2025

(54) MASS INSERTION INTO SINGLE-THREADED DATABASES

(71) Applicant: Roku, Inc., San Jose, CA (US)

(72) Inventor: Roberto Mirizzi, Santa Clara, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/817,998

(22) Filed: Aug. 28, 2024

(65) Prior Publication Data

US 2024/0419692 A1    Dec. 19, 2024

Related U.S. Application Data

(63) Continuation of application No. 18/303,615, filed on Apr. 20, 2023, now Pat. No. 12,105,739, which is a continuation of application No. 16/939,758, filed on Jul. 27, 2020, now Pat. No. 11,663,242, which is a continuation of application No. 15/849,103, filed on Dec. 20, 2017, now Pat. No. 10,726,051.

(51) Int. Cl.
| | |
|---|---|
| G06F 16/28 | (2019.01) |
| G06F 16/18 | (2019.01) |
| G06F 16/21 | (2019.01) |
| G06F 16/23 | (2019.01) |
| G06F 16/2453 | (2019.01) |
| G06F 16/25 | (2019.01) |

(52) U.S. Cl.
CPC ............ *G06F 16/285* (2019.01); *G06F 16/18* (2019.01); *G06F 16/21* (2019.01); *G06F 16/23* (2019.01); *G06F 16/2308* (2019.01); *G06F 16/24532* (2019.01); *G06F 16/256* (2019.01)

(58) Field of Classification Search
CPC ................................ G06F 18/22; G06F 18/10
See application file for complete search history.

(56) References Cited

U.S. PATENT DOCUMENTS

| | | |
|---|---|---|
| 9,842,031 B1 | 12/2017 | Kharatishvilli |
| 10,726,051 B2 | 7/2020 | Mirizzi |
| 11,663,242 B2 | 5/2023 | Mirizzi |

(Continued)

OTHER PUBLICATIONS

International Search Report and Written Opinion for International Patent Application No. PCT/US2018/062562, dated Mar. 11, 2019.
Supplementary European Search Report from European Patent Application No. 18891115.0, dated Aug. 2, 2021 (8 pages).
Gong, Weiwei, "Improving Main-Memory Database (MMDB) Distributed Transactional Concurrency," U. Mass. Boston (Dec. 2014) (95 pages).

(Continued)

*Primary Examiner* — Truong V Vo
(74) *Attorney, Agent, or Firm* — Sterne, Kessler, Goldstein & Fox P.L.L.C.

(57) ABSTRACT

Disclosed herein are system, method, and computer-readable device embodiments for mass insertion into single-threaded databases. An embodiment includes a processor and a memory, a storage layer to interface with a plurality of software applications and to receive data output from the plurality of software applications, and a listener that runs according to an update policy, to detect the presence of information newly stored within the storage layer. The processor and memory may be configured to maintain at least a part of a running database cluster including a plurality of nodes, with at least two nodes configured to run without multi-threading, and to execute an intermediate module to send at least part of the information to the database cluster, and to perform simultaneous access to multiple database nodes running without multi-threading.

20 Claims, 7 Drawing Sheets

(56) References Cited

U.S. PATENT DOCUMENTS

| | | | |
|---|---|---|---|
| 2006/0010170 | A1 | 1/2006 | Lashley et al. |
| 2009/0089334 | A1 | 4/2009 | Mohamed et al. |
| 2013/0339516 | A1 | 12/2013 | Chauhan et al. |
| 2015/0052104 | A1 | 2/2015 | Shadmon |
| 2015/0142733 | A1 | 5/2015 | Shadmon |
| 2016/0085809 | A1 | 3/2016 | de Castro Alves et al. |
| 2016/0292257 | A1 | 10/2016 | Bar et al. |
| 2016/0378691 | A1 | 12/2016 | Sherman |
| 2017/0006135 | A1 | 1/2017 | Siebel et al. |
| 2017/0111365 | A1 | 4/2017 | Michael et al. |
| 2019/0188314 | A1 | 6/2019 | Mirizzi |
| 2021/0149922 | A1 | 5/2021 | Mirizzi |
| 2023/0259532 | A1 | 8/2023 | Mirizzi |

OTHER PUBLICATIONS

"Transaction log," Wikipedia (User Hocngo), Jul. 23, 2017 (3 pages), https ://en. wikipedia. org/w /index. php?title=Transaction _ lo g&oldid=792004 931.

Communication pursuant to Article 94(3) EPC issued in corresponding European Application No. 18891115.0 mailed Jul. 28, 2022, 9 pages.

Rabelo, B.M. and DAVIS Jr., C.A., "SODDA—A Service-Oriented Distributed Database Architecture," Accession No. XP055937606, Dec. 31, 2008, accessed at https://homepages.dcc.ufmg.br/~clodoveu/files/100.40/AC042.%202008%20SODDA%20-%20a%20service-oriented%20distributed%20database%20architecture.pdf, accessed on Jul. 1, 2022, 4 pages.

Summons to Attend Oral Proceedings Pursuant to Rule 115(1) EPC directed to related European Patent Application No. 18891115.0, mailed May 13, 2024; 50 pages.

MASS INSERTION INTO SINGLE-THREADED DATABASES

CROSS-REFERENCE TO RELATED APPLICATIONS

This application is a continuation of U.S. patent application Ser. No. 18/303,615, filed Apr. 20, 2023, now allowed, which is a continuation of U.S. patent application Ser. No. 16/939,758, filed Jul. 27, 2020, issued as U.S. Pat. No. 11,663,242, which is a continuation of U.S. patent application Ser. No. 15/849,103, filed Dec. 20, 2017, issued as U.S. Pat. No. 10,726,051, the entirety of which is incorporated herein by reference.

BACKGROUND

Field

This disclosure is generally directed to single-threaded databases handling mass-insertion operations capable of parallelization.

Background

Up to now, single-threaded database servers have been unable to execute multiple simultaneous operations in parallel. Although this aspect of single-threaded database access serves to maintain data concurrency, it can also result in unacceptable delays when one application tries to access data also being accessed by another application at the same time.

In applications where concurrency is not as important, the delays can be mitigated with more complex solutions, such as by using additional separate database servers and/or using at least one other type of database server that allows multi-threaded database access. However, this approach can incur other overhead, requiring more resources to resolve. In many such scenarios here, where data concurrency is not the main priority, reduction of this overhead would require a new solution that would allow many applications to perform simultaneous read/write access to single-threaded database servers.

SUMMARY

Provided herein are system, apparatus, article of manufacture, method and/or computer program product embodiments, and/or combinations and sub-combinations thereof, for enabling simultaneous accesses by multiple applications to single-threaded database servers, including mass insertion of database entries. This technology may be utilized in innovative ways to provide enhanced media streaming functionality, content recommendations, metadata access, to name a few specific examples, as well as numerous other general or specific database applications.

An embodiment is directed to system, apparatus, article of manufacture, method and/or computer program product embodiments, and/or combinations and sub-combinations thereof, for mass insertion into single-threaded databases.

In some embodiments, a system for mass insertion into single-threaded databases may include a processor and a memory, a storage layer to interface with a plurality of software applications and to receive data output from the plurality of software applications, and a listener. The listener may run according to an update policy, to detect presence of information newly stored within the storage layer. The processor and memory may be configured to maintain at least a part of a running database cluster including a plurality of nodes, with at least two nodes configured to run without multi-threading, and to execute an intermediate module to send at least part of the information stored within the storage layer to the database cluster, and to perform simultaneous access to multiple database nodes running without multi-threading.

In this way, processing time and/or resource overhead may be reduced by orders of magnitude compared to conventional approaches. Additionally, dramatic increases in speed may be achieved, which may advantageously enhance overall performance and/or which may avoid unacceptable system failures. Another benefit is the ability to parallelize clusters of single-threaded databases.

Other embodiments may be directed to apparatus, article of manufacture, computer-implemented method and/or computer program products including computer-readable device embodiments, and/or combinations and sub-combinations thereof, for mass insertion into single-threaded databases, according to embodiments further described herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
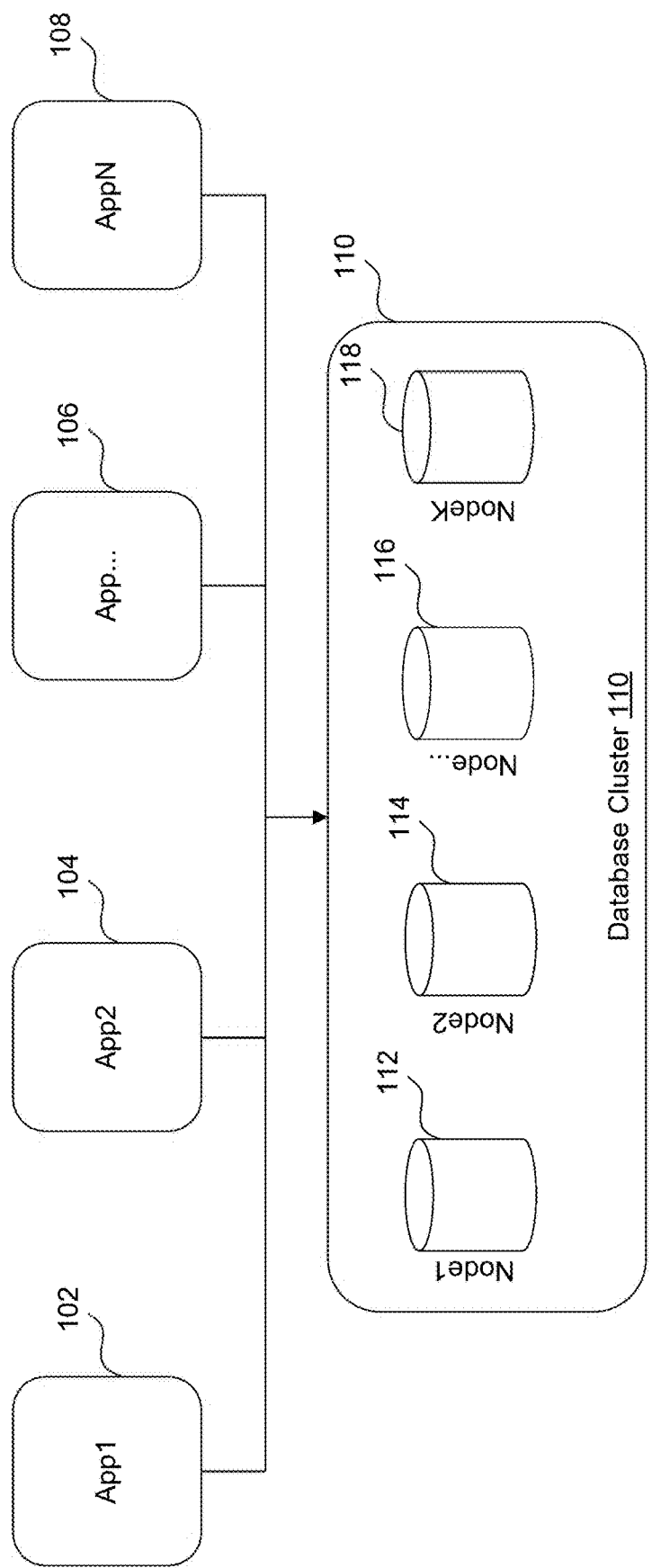
FIG. 1 illustrates a block diagram of an architecture for insertion in a single-threaded database.

FIG. 1 illustrates a block diagram of an architecture for insertion in a single-threaded database.

In a setup involving multiple applications accessing a single-threaded database server, even in a cluster of multiple nodes, it is not possible to execute multiple operations in parallel at the same time. For some uses, this limitation may be acceptable. However, other uses may find this limitation to be suboptimal, and this limitation may degrade system performance and user experience to an unacceptable level.

For example, a system 100 reflects a configuration of multiple applications App1-AppN (102-108) of quantity N, configured to access a database cluster 110 having an arbitrary number of nodes Node1-NodeK (112-118) of quantity K. Quantity K may likely (but not necessarily) be a different value from quantity N. K and N each may theoretically be any whole number, but for purposes of this example discussion, K and N each should be at least 2 (e.g., eliminating 104, 106, 114, and 116 if both were exactly 2), but would typically have much greater values for both.

Each of the N applications 102-108 may generate some output that may need to be stored persistently by writing the output into the database cluster 110. In this architecture of system 100 in FIG. 1, each application would be responsible for writing its data directly to the database cluster 110 via a cluster interface. However, with single-threaded databases, concurrent writes are not possible. For example, if App1 102 is writing to the database cluster 110, there would be contention if App2 104 (and/or AppN 108 or any of the other applications 106) were to attempt a concurrent write to the database cluster 110, causing any or all of the other applications 104-108 that would need to access the database cluster 110 therefore to wait for App1 to finish writing, and this may also result in other overhead in system 100 and/or database cluster 110 caused by the contention for the database cluster 110 resource(s).

Additionally, to achieve some degree of concurrency as desired, depending on implementation details, efficiency, degree of data redundancy desired, or other factors of the designed capabilities of the databases nodes within the database cluster 110, any of Node1-NodeK 112-118 may mirror the data in any or all of the other nodes (and/or vice-versa) after it is newly written. However, there may be other bottlenecks encountered when trying to synchronize and maintain some degree of concurrency and consistency with a cluster of single-threaded databases such as database cluster 110, especially as limitations of single-threaded databases may limit the ability to leverage the distributed nature of databases in database clusters such as database cluster 110. Techniques discussed below with respect to FIG. 5 may considerably enhance performance of single-threaded database clusters without resorting to multi-threading.

Where quality of service is sufficient, such as where any real-time demands may be soft or nonexistent, it may be acceptable for any or all of these applications to wait for any of the other applications to hold and release the database cluster 110 resource(s) in contention. Even in such cases, however, as the quantity N of applications grows, quality of service may likely drop to unacceptable levels.

For example, App2 104 may be attempting to fetch information from the database cluster 110 in order to serve at least one actual user. In this case, if any other applications, e.g., 106, are currently blocking database cluster 110 resource(s), then at least App2 104 will hang and be unable to serve the at least one actual user in a timely manner. If this hang results in an unexpected delay of even a few seconds for the user, for example, using an on-demand streaming media service, such a delay may be an unacceptable problem.

Aside from these data- or resource-contention problems and/or forced concurrency resulting in delays, other factors may negatively affect response time, user experience, and quality of service. For example, sheer size or volume of data to be processed into a database, may overload capacity of any individual node or cluster at a given time, resulting in various performance bottlenecks that may result in unacceptable delays or system failures.

Where higher quality of service is preferred, demanded, and/or absolutely necessary, another model may be necessary in order to ensure reliable access within specific latency tolerances, avoiding the problem identified above with respect to system 100 in FIG. 1.

Figure 2:
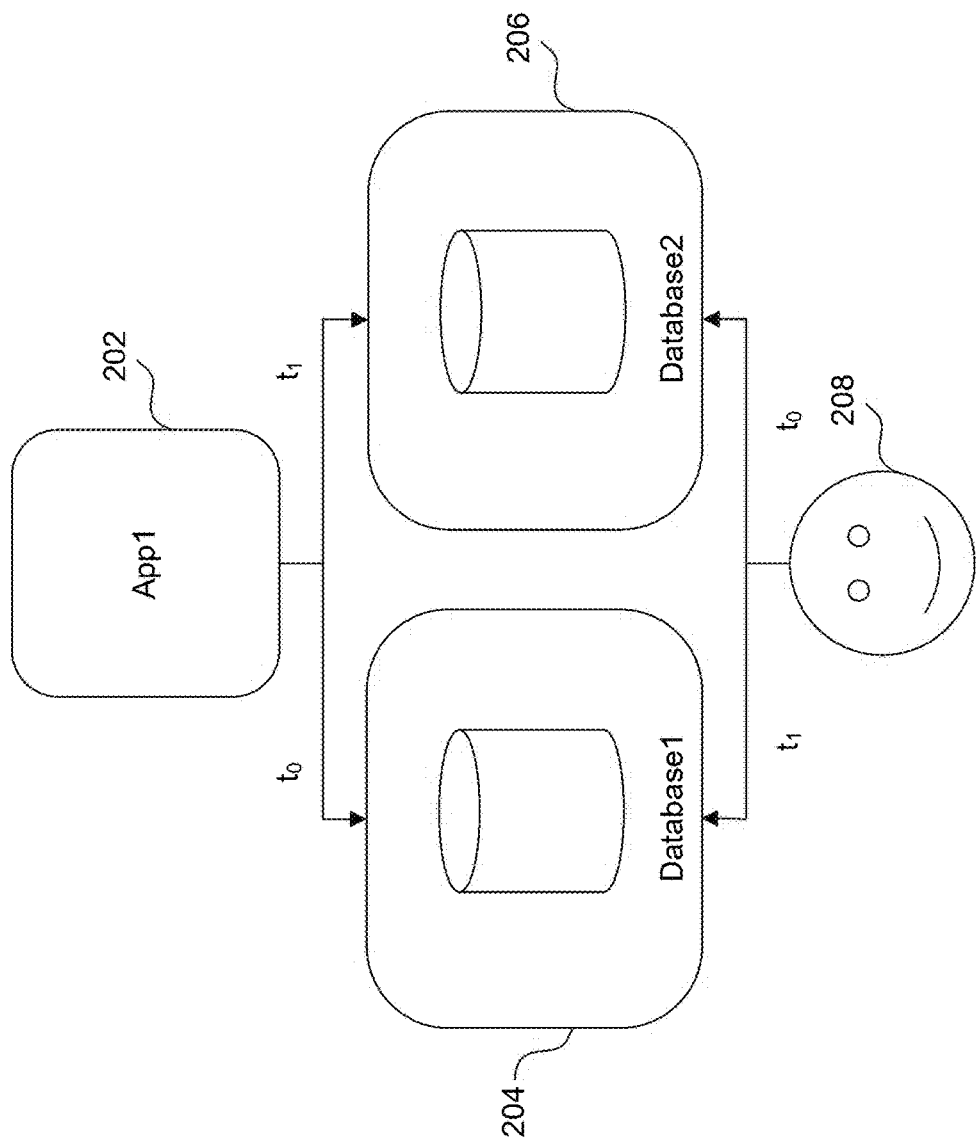
FIG. 2 illustrates a system for mitigating potential contention problems described with respect to FIG. 1, according to some embodiments.

FIG. 2 illustrates a system 200 for mitigating the contention problem described above with the system 100 illustrated in FIG. 1.

Here, an application App1 202 may have access to multiple separate single-threaded databases, e.g., at least Database1 204 and Database2 206. These multiple separate single-threaded databases may have substantially similar entries, in some embodiments. A user 208, directly or by way of a separate application (not shown), may also have access to the same multiple single-threaded databases, or at least to a subset thereof.

For example, at a time t0, App1 202 may access Database1 204 to write data, and user 208 may simultaneously access Database2 206, avoiding any possible contention problems. In a case where user 208 need not be concerned about concurrency (in this case, accessing at time to the data that App1 202 is simultaneously writing to Database1 204), then any synchronization mechanisms or lack thereof between the multiple separate databases may be considered entirely independent of the functionality described here for purposes of this example. At a later time t1, App1 202 may write to Database2 206, writing the same update as the write to Database1 204 at t0, or writing different data instead, to Database2 206. At the same time t1, user 208 may separately access Database1 204. Additionally, or alternatively, depending on implementation details, efficiency, degree of data redundancy desired, or other factors of the designed capabilities of the databases, Database1 204 may mirror the data in Database2 406 (and/or vice-versa) after it is newly written, to maintain some degree of concurrency.

In this example, there is at least one database for each instance of applications and users, collectively, such that each application and user has access to a database. However, in similar fashion to the problem with system 100 of FIG. 1, the system 200 may not be able to scale up to larger numbers of applications and/or users, greater than the number of databases, database servers, and/or database clusters, without having to manage contention for data and other resources.

In order to facilitate efficient exchange of resources between t0 and t1, where there could potentially be contention, system 200 may use state indicators including signals, shared memory, semaphores, flags, files (such as in another filesystem or a table in another database) and/or other comparable constructs or techniques for interprocess communications and/or parallel computing. Other resource-use policies may be defined to prevent deadlocks or other execution hazards. State indicators such as those listed above may be periodically polled for enforcement of resource-use policies, such as by one or more watchdog processes and/or event handlers, such as in systems configured to respond to event-driven triggers, in some embodiments.

However, even when system 200 is implemented with particular database architectures specifically designed to keep user- and/or read/write-state information of databases in a similar manner (e.g., DynamoDB, to name one non-limiting, non-exhaustive example), just the overhead of tracking, maintaining, and/or managing state may quickly become unsustainable for large numbers of applications concurrently writing to any given cluster(s) with a finite number of nodes.

Compared to scaling of system 100, scaling of this system 200 may be relatively more effective at handling contention for larger numbers of applications and/or users, but such scale-up would also require considerably more resources and expense to set up, scale up, and maintain. This may be the case even more so when maintaining a specific level of quality of service, especially when a system provider or administrator wishes to ensure that users are served with no unexpected delays, slowdowns, or other system failures.

Just as system 100 of FIG. 1 may encounter unacceptable lapses of quality of service when scaling up the number of applications or users, so too may the system 200 of FIG. 2 incur degraded performance and quality of service as applications and/or users exceed certain numbers relative to a given number of databases. Unlike system 100, which has only one fixed interface to the database cluster 110, system 200 is somewhat scalable to accommodate increased demand from applications and/or users.

However, even without accounting for more intricate problems of congestion, synchronization, and other issues of managing databases and various elements of communication infrastructure, this scalability may require provisioning of resources with a roughly linear correlation to peak usage by applications and users. To many if not most providers of multiple databases, the level of expenditures needed to cover the costs of having these extra resources available may be prohibitive, making system 200 at least as unacceptable as a system 100 or under-provisioned system 200 that would cause long delays for users attempting to access database entries.

In the scenarios described in both FIGS. 1 and 2, another ensuing problem may be that, because only one application or user may be able to access the single-threaded database at any given time, all writes must be sequential, such that a subsequent write cannot begin until the previous write has ended. Essentially, each accessing process locks or blocks the database for one write at a time. As will be appreciated by persons skilled in the relevant art(s), such locking, blocking, and/or contention may result in significant slowdowns.

FIGS. 3-6 present embodiments that solve the problems discussed above with respect to FIGS. 1 and 2. One way to solve these problems may involve decoupling application output from database persistence. Compared to an architecture in which output from each application must be written directly into any given database as soon as possible or risk hanging if a database is not available, this disclosure describes improved systems in which information (data, which may include metadata) may be stored intermediately, such as in a common filesystem, and then separately inserted into a single-threaded database cluster quickly and in an orderly fashion, without locking or otherwise interrupting access to the database by other applications.

Figure 3:
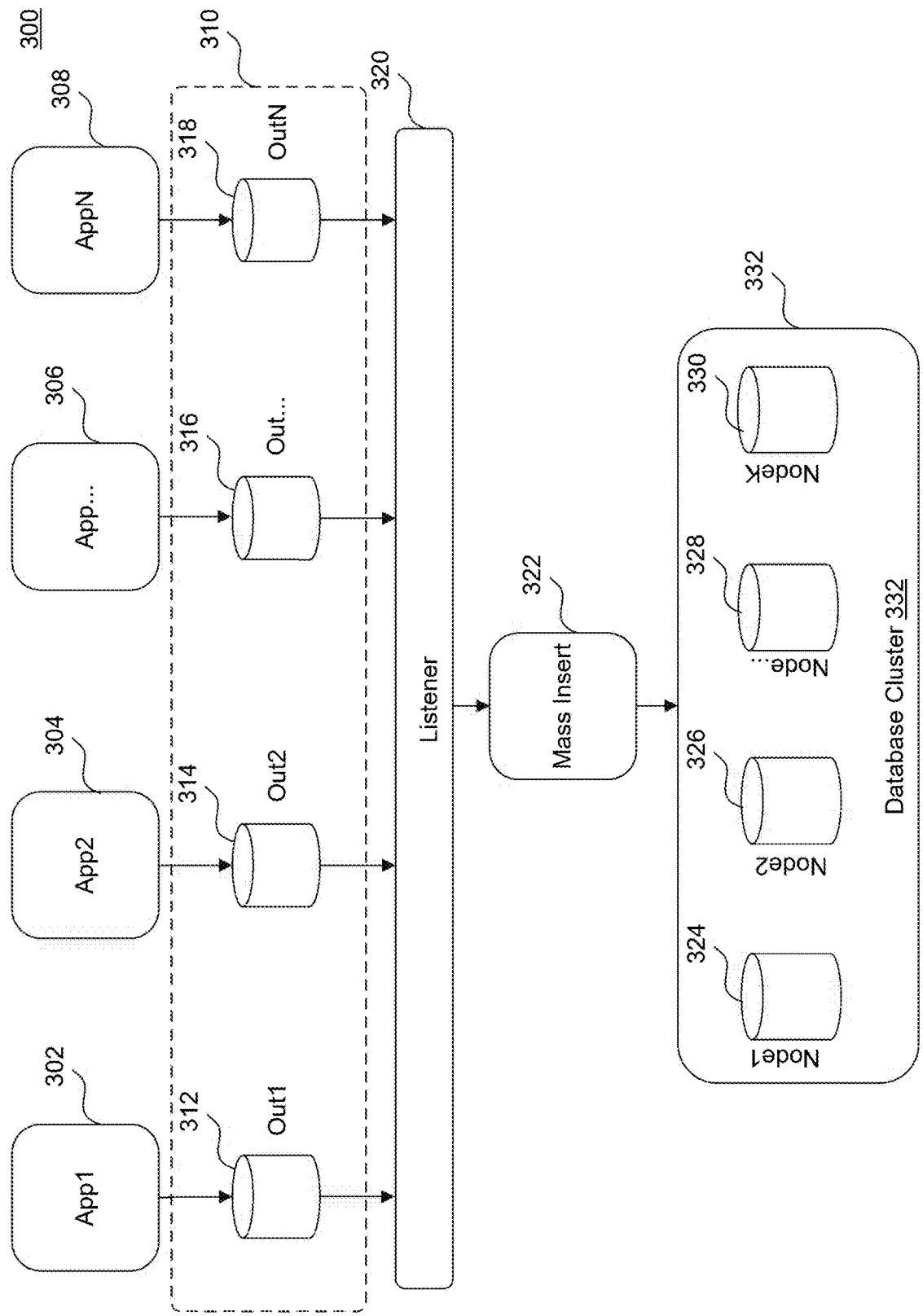
FIG. 3 illustrates an alternative system that decouples application output operations from database-cluster write operations, and includes mass-insertion functionality to streamline the eventual write operations to store application output information persistently in a database cluster, according to some embodiments.

FIG. 3 illustrates an alternative system 300 configured to decouple application output operations from database-cluster write operations, and includes mass-insertion functionality to streamline the eventual write operations to store application output information persistently in a database cluster. The decoupling may effectively be a result of one or more layers or stages of separation, comprising at least one storage module and/or at least one specialized operation module as intermediate modules between a database cluster and any or all applications accessing the database cluster.

According to the non-limiting example embodiment of the alternative system 300 of FIG. 3, the separation may be accomplished using a storage layer 310 interfacing with quantity N applications 302-308. Storage layer 310 may be a unified data store, common filesystem, or shared storage in which application output data may be addressed and temporarily stored, in some embodiments, some examples of which may include any of a local volume or dataset (e.g., XFS, ZFS, etc.), network share (e.g., NFS, CIFS, etc.), network-attached storage (NAS) backed with any of the above storage types, storage area network (SAN) shared-disk filesystems, distributed filesystem (e.g., HDFS, GFS, etc.), or any combination thereof. In these cases of common filesystems, the storage layer 310 may provide a single abstraction, including a common (or merged or unified) address space or namespace, to accommodate an arbitrary amount of application output data 312-318 corresponding to each application 302-308 in any convenient order or in no particular order.

In other embodiments, storage layer 310 may be an object-storage layer, offline or online, including cloud-based object storage or hybrid storage (e.g., S3, Ceph, Minio, etc.). In these embodiments, application output data 312-318 corresponding to each application 302-308 may be stored as objects in the storage layer 310 as separate objects. The separate objects may reside on the same common filesystem as described above, or they may be independently distributed, such as in a cloud or cloud-like environment. In some of these embodiments, independently distributed objects may be addressed, referenced, and/or accessed using a single (unified or merged) abstraction as if they were on a single common filesystem.

With any of the above (or similar) embodiments of storage layer 310, applications, such as App1-AppN 302-308 no longer need to write directly to any single-threaded database cluster interface (unlike in FIG. 1). Rather applications may write, each at its own convenience, to the storage layer 310 instead. This feature eliminates the need for managing contention between applications and/or users and renders application output, and possibly some general operations per application, independent of other applications and their operations and/or outputs. When an application finishes writing its output data into data storage, the application may terminate.

With any or all of the new architectures or alternative systems described herein, object storage may be especially advantageous for storing a relatively large number of relatively small chunks of data generated from any number of applications, particularly in scenarios where concurrency and update latency with respect to a given object are of less concern, but where availability and read latency are more highly valued. One example of such a particular scenario may be with generating, collecting, updating, and/or accessing content recommendations for streaming media services, along with content metadata and user profile information used for creating those content recommendations.

Further describing an exemplary use case of storing content recommendations as they are generated, sources of these content recommendations may generate billions of records in relatively short time intervals, which may need to be persistently stored in a database within a relatively short time. Although data concurrency may not be a high priority at any given time, these outputs from content recommendation sources may later be inputs for future content recommendations. However, each application need not be aware of the existence of any other application.

Other use cases abound in which extremely large quantities and volumes of data must be quickly generated and stored persistently. In combination with other techniques described herein, these operations for mass insertion into single-threaded databases may be realized in scalable implementations, advantageously cutting conventional processing time and resource overhead by orders of magnitude.

In some additional embodiments of alternative system 300, there may be an additional module illustrated here as a "listener" 320 attached to the storage layer 310. Listener 320 may periodically "listen" for new data or files, actively polling for new changes based on triggering events, schedules, or similar constructs, which constitute an update policy. In some embodiments, such listening may be carried out by periodically fetching or listing the contents of a filesystem, monitoring snapshot (copy-on-write, journal, delta, etc.) listings or status information, or querying an object-storage API, or executing system calls, to name a few non-limiting, non-exhaustive examples in some embodiments. In certain other embodiments, the listener 320 may passively wait for specific signals, system calls, (file) system notifications, etc., or any combination thereof. In some embodiments, passive or periodic actions may be performed by lambda functions (lambda calculus), functional programming (function-level programming), meta-programming, multi-stage programming, multi-paradigm programming, etc. Such programming may have the added effect of saving additional resources overall and being able to be offloaded to cloud-based or other off-site and/or third-party services.

The latter techniques of the certain other embodiments may not be available on all systems or databases, but may, where available, increase or decrease overall efficiency of the storage layer 310, listener 320, and/or mass-insertion module 322, depending on average fill rate of the storage layer 310 (or particular outputs or objects therein), processing overhead of the listener 320, and/or processing overhead of mass-insertion operations performed by the mass-insertion module 322. While fill rates and average fill rate pertaining to the storage layer 310 may depend on external factors of the applications and any of their users, data sources, and any expected output, processing overhead of listener 320 and mass-insertion module 322 may also depend on implementation details intrinsic to each.

For safer operation, and to avoid excessive overhead and churn in any or all elements between the applications 302-308 and the database nodes 324-330 within the database cluster 332, listener 320 may be made aware of execution states of applications corresponding to specific output data and/or objects written (or being written) in the storage layer 310. This may be done using any of the state indicators and/or other interprocess communications or similar techniques disclosed herein. As noted above, when an application finishes writing its output data into data storage, the application may terminate—in embodiments where this behavior may the expected behavior in a given alternative system 300, then listener 320 may also observe and/or await a change in execution state of an application writing a corresponding output (e.g. App2 304 writing to Out2 314). Efficient operation in these embodiments would dictate that listener 320 wait until termination of the writing application before further processing any of the corresponding data written into the storage layer 310.

Regardless of how listener 320 learns of new information in storage layer 310, listener 320 may, according to programmable rule(s), schedule(s), and/or predetermined algorithm(s), relay relevant new information and/or metadata thereof to another module, such as mass-insertion module 322 to feed the new data (possibly from many applications) into database cluster 332 in a manner that may be more efficient for the database cluster 332 and/or one or more database nodes 324-330 therein, in some embodiments.

An example embodiment of mass-insertion module 322 may be an existing feature in a database implementation (e.g., Redis, DB2, etc.). Where an existing mass-insertion module 322 is not already implemented by default, a comparably functional module may be custom-implemented. The custom implementation may be platform-native, a plugin, wrapper, shell script, etc., or any combination thereof, to name a few non-limiting, non-exhaustive example embodiments.

In some embodiments, mass-insertion module 322 may accept its input (in this embodiment, input to mass-insertion module 322 may be output of at least one application 302-308) in a standard format (e.g., JSON, XML, key-value pair plain text, etc.), or alternatively may require or favor its input in a preferred custom protocol (compacted, custom binary, compressed with quick algorithm(s), etc.) to improve processing speed and/or reduce processing overhead, for example. To this end, it may be necessary to have applications 302-308 output their output data in the preferred or required format(s) or use a separate module (not shown) to perform conversion of expected application output data to a preferred or required format dictated by the mass-insertion module 322.

Additionally, to achieve some degree of concurrency as desired, depending on implementation details, efficiency, degree of data redundancy desired, or other factors of the designed capabilities of the databases nodes within the database cluster 332, any of Node1-NodeK 112-118 may mirror the data in any or all of the other nodes (and/or vice-versa) after it is newly written. However, there still may be other bottlenecks encountered when trying to synchronize and maintain some degree of concurrency and consistency with a cluster of single-threaded databases such as database cluster 332, even with the improvements of the alternative system 300 depicted in FIG. 3. This may be especially the case as the limitations of single-threaded databases may limit the ability to leverage the distributed nature of databases in database clusters such as database cluster 332. Techniques discussed below with respect to FIG. 5 may considerably enhance performance of single-threaded database clusters.

Even in a scenario of only one node being writable, data written from the mass-insertion module 322 may be serialized to allow for a large write (batch write, serial write, or mass insertion) operation to insert new entries all at once, rather than waiting for bidirectional communications with the database, in some embodiments. This advantage has been shown to yield a noticeable improvement over certain approaches. For example, in actual implementations of some embodiments of both FIGS. 2 and 3 using a Redis cluster as database cluster 332, tests have shown empirically that the mass-insertion module 322 of FIG. 3 tends to improve performance over Redis embodiments of FIG. 2 by 5×- to 10×-reductions in access latency. Other embodiments may vary depending on database implementation, data types, data sizes (e.g., of content recommendations), etc.

Compared to FIG. 3, performance may be enhanced further still, by combining the improvements of FIG. 3 with the improvements of FIG. 2. This may be seen in FIG. 4 and described below in the accompanying description of FIG. 4.

Figure 4:
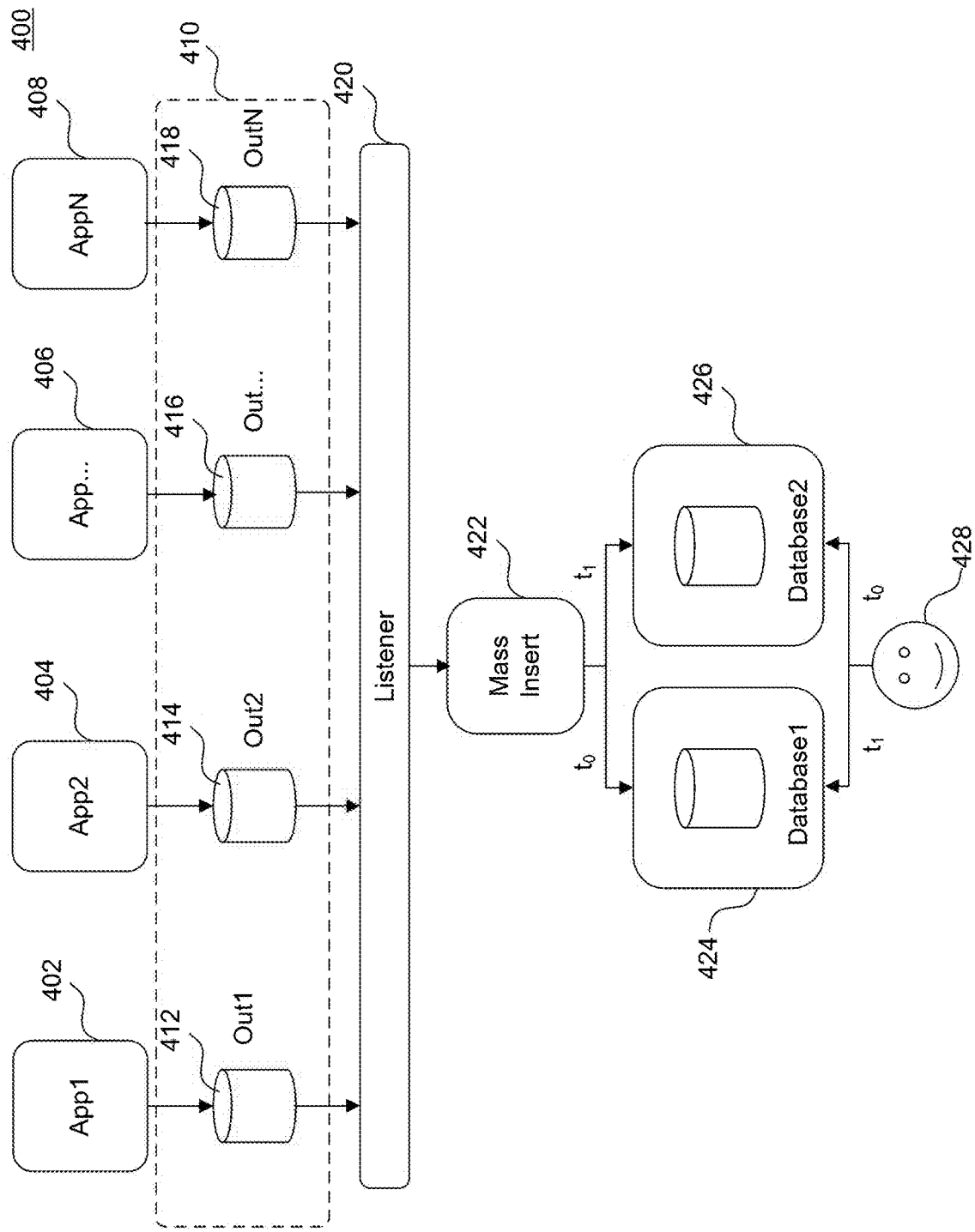
FIG. 4 illustrates a combined system, adapting a parallel database architecture from an example system of FIG. 2 to use a storage layer, a listener-type element, and an intermediate module such as the mass-insertion module in the architecture of the alternative system of FIG. 3, according to some embodiments.

FIG. 4 illustrates a combined system 400, adapting a parallel multi-database architecture similar to that of system 200 of FIG. 2 to use a storage layer, a listener-type element, and an intermediate module such as the mass-insertion module in the architecture of the alternative system 300 of FIG. 3. These added features of the alternative system 300 may streamline write accesses enough for smoothly accommodating more applications (App1-AppN 402-408) compared to the system 200 of FIG. 2.

Here, an application (any of App1-AppN 402-408) may output data to be ultimately stored in at least one of multiple separate single-threaded databases, e.g., at least Database1 424 and Database2 426. These multiple separate single-threaded databases, including Database1 424 and Database2 426 may have substantially similar entries. These databases represent one example; other embodiments may use a database cluster in lieu of any database, conceptually similar to database cluster 332 of FIG. 3 above. For case of illustration, this exemplary embodiment of FIG. 4 shows two databases, but in practice, any number of databases or database clusters may be deployed and used in the same manner as shown here. A user 428, directly or by way of a separate application (not shown), also has access to the same multiple single-threaded databases, or at least to a subset thereof.

Instead of writing the output data directly into any of the multiple single-threaded databases, any or all of the quantity N applications may write their output data into a storage layer 410 interfacing with the applications 402-408. Storage layer 410 may be a unified data store, common filesystem, or shared storage in which application output data may be addressed and temporarily stored, in some embodiments, some examples of which may include any of a local volume or dataset, network share, NAS backed with any of the above storage types, SAN shared-disk filesystems, distributed filesystem, or any combination thereof. In these cases of common filesystems, the storage layer 410 may provide a single abstraction, including a common (or merged or unified) address space or namespace, to accommodate an arbitrary amount of application output data 412-418 corresponding to each application 402-408 in any convenient order or in no particular order.

In other embodiments, storage layer 410 may be an object-storage layer, offline or online, including cloud-based object storage or hybrid storage. In these embodiments, application output data 412-418 corresponding to each application 402-408 may be stored as objects in the storage layer 410 as separate objects. The separate objects may reside on the same common filesystem as described above, or they may be independently distributed, such as in a cloud or cloud-like environment. In some of these embodiments, independently distributed objects may be addressed, referenced, and/or accessed using a single (unified or merged) abstraction as if they were on a single common filesystem.

In some additional embodiments of alternative system 400, there may be an additional module illustrated here as a "listener" 420 attached to the storage layer 410. Listener 420 may periodically "listen" for new data or files, actively polling for new changes based on triggering events, schedules, or similar constructs, which constitute an update policy. In some embodiments, such listening may be carried out by periodically fetching or listing the contents of a filesystem, monitoring snapshot (copy-on-write, journal, delta, etc.) listings or status information, or querying an object-storage API, or executing system calls, to name a few non-limiting, non-exhaustive examples in some embodiments. In certain other embodiments, the listener 420 may passively wait for specific signals, system calls, (file) system notifications, etc., or any combination thereof. In some embodiments, passive or periodic actions may be performed by lambda functions (lambda calculus), functional programming (function-level programming), meta-programming, multi-stage programming, multi-paradigm programming, etc. Such programming may have the added effect of saving additional resources overall and being able to be offloaded to cloud-based or other off-site and/or third-party services.

The latter techniques of the certain other embodiments may not be available on all systems or databases, but may, where available, increase or decrease overall efficiency of the storage layer 410, listener 420, and/or mass-insertion module 422, depending on average fill rate of the storage layer 410 (or particular outputs or objects therein), processing overhead of the listener 420, and/or processing overhead of mass-insertion operations performed by the mass-insertion module 422. While fill rates and average fill rate pertaining to the storage layer 410 may depend on external factors of the applications and any of their users, data sources, and any expected output, processing overhead of listener 420 and mass-insertion module 422 may also depend on implementation details intrinsic to each.

With any of the above (or similar) embodiments of storage layer 410, applications, such as App1-AppN 402-408 may no longer need to write directly into any single-threaded database (unlike in FIG. 2). Rather, applications may write, each at its own convenience, to the storage layer 410 instead. This feature eliminates the need for managing contention between applications and/or users and renders application output, and possibly some general operations per application, independent of other applications and their operations and/or outputs. When an application finishes writing its output data into data storage, the application may terminate.

As noted above with respect to FIG. 3, with any or all of the new architectures or alternative systems described herein, object storage may be especially advantageous for storing a relatively large number of relatively small chunks of data generated from any number of applications, particularly in scenarios where concurrency and update latency with respect to a given object are of little concern, but where availability and read latency are more highly valued. One example of such a particular scenario would be with generating, collecting, updating, and/or accessing content recommendations for streaming media services, along with content metadata and user profile information used for creating those content recommendations. However, it should be understood that this disclosure is not limited to that example scenario.

As with the system 200 depicted in FIG. 2, at a time t0, user 428 may access Database2 426 at the same time Database1 is being written to by another process (e.g., from mass-insertion module 422 instead of any of App1-AppN 402-408), avoiding any possible contention problems. In a case where user 428 need not be concerned about concurrency (in this case, accessing at time t0 the data that mass-insertion module 422 is simultaneously writing to Database1 424), then any synchronization mechanisms or lack thereof between the multiple separate databases is not relevant for purposes of this example. At a later time t1, mass-insertion module 422 may write to Database2 426, writing the same update as the write to Database1 424 at t0, or writing different data instead, to Database2 426. At the same time t1, user 428 may separately access Database1 424. Additionally, or alternatively, depending on implementation details, efficiency, degree of data redundancy desired, or other factors affecting performance of internal database operations in comparison with mass-insert operations, Database1 424 may mirror the data in Database2 426 (and/or vice-versa) after it is newly written, to have some degree of concurrency.

In this example, there is at least one database for each instance of applications and users, collectively, such that each application and user has access to a database. However, in similar fashion to the problem with the system 200 of FIG. 2, the system 400 may not be able to scale up to larger numbers of applications and/or users, greater than the number of databases, database servers, and/or database clusters, without having to manage contention for data and other resources.

In order to facilitate efficient exchange of resources between t0 and t1, where there could potentially be contention, as with system 200, system 400 may also use state indicators including signals, shared memory, semaphores, flags, files (such as in another filesystem or a table in another database) and/or other comparable constructs or techniques for interprocess communications and/or parallel computing.

Other resource-use policies may be defined to prevent deadlocks or other execution hazards. State indicators such as those listed above may be periodically polled for enforcement of resource-use policies, such as by one or more event handlers and/or watchdog processes. In some embodiments, passive or periodic actions may be performed by lambda functions, functional programming, meta-programming, multi-stage programming, multi-paradigm programming, etc. Such programming may have the added effect of saving additional resources overall and being able to be offloaded to cloud-based or other off-site and/or third-party services, which may beneficially yield a net savings in operating costs.

However, even when system 400 is implemented with particular database architectures specifically designed to keep state in a similar manner, just the overhead of maintaining and/or managing state may quickly become unsustainable for large numbers of applications concurrently writing to any given cluster(s) with a finite number of nodes. Thus, much of the benefit that may be realized from system 400 may be attributed more to features of elements 410-422 of FIG. 4 (corresponding to elements 310-322 of FIG. 3) rather than the parallel database architecture of multiple single-threaded databases. Such benefits of the features of elements 410-422 of FIG. 4 may be further leveraged by tuning structure(s) and algorithm(s) used to manage database clusters, as opposed to implementing multiple-database architectures such as those shown in FIG. 2

Compared to scaling the alternative system 300, scaling this system 400 in order to handle contention for larger numbers of applications and/or users may be relatively more efficient, but such scale-up may also require considerably more resources and expense to set up, scale up, and maintain, although not necessarily as much as would be required for system 200. This may be the case even more so when maintaining a specific level of quality of service, especially when a system provider or administrator wishes to ensure that users are served with no unexpected delays, slowdowns, and/or other system failures.

Thus, overall, arrangement of this system 400 may mitigate access latency as well as contention for data and resources. However, even with multiple single-threaded databases that may be simultaneously accessed in parallel by multiple users and/or applications (as long as simultaneous accesses do not exceed the number of available databases), writes, such as from the mass-insertion module 422, may still be made more efficient, such as by leveraging distributed database clusters rather than sequentially or serially accessing multiple separate single-threaded databases. More details on such improvements are discussed with respect to FIG. 5 below.

Figure 5:
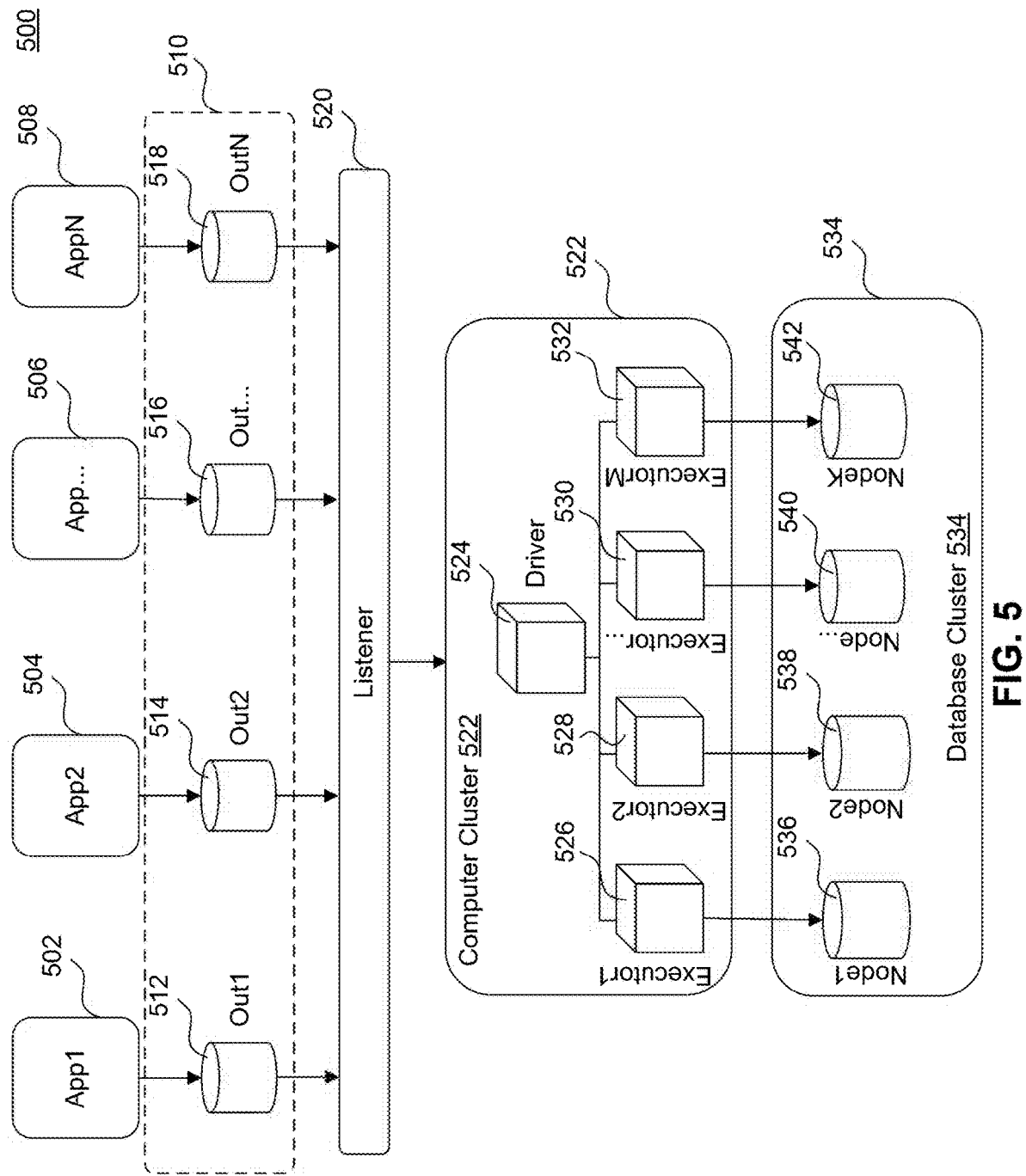
FIG. 5 illustrates a block diagram of a new clustered system 500, according to some embodiments.

FIG. 5 illustrates a block diagram of a new clustered system 500 according to an example embodiment.

As described above in various examples depicted by FIGS. 1-4, elements pertaining to single-threaded databases are at a disadvantage in database cluster settings, where a single interface may block a whole cluster waiting for any single node to complete a write, for example. This shortcoming limits database cluster performance, in one or more aspects at least by hindering distributed access and parallelism.

Partial solutions shown in FIG. 2 and improved in FIG. 4 may reduce contention for resources and data, but these partial solutions may be incomplete in that they may still be subject to some degree of contention among competing applications and/or users attempting to access any one of the databases. Additionally, these partial solutions may not scale up efficiently, if they could be scaled up at all. The improved partial solutions of FIGS. 3 and 4 may realize the full benefit of this Detailed Disclosure, but only if they access one single-threaded database at a time or operate on a database "cluster" having only one node.

Unlike the scenarios of FIGS. 1 and 2, the embodiments of FIGS. 3 and 4 may implement an intermediate module in the form of a mass-insertion module 322 and 422, respectively, as a single application making the only writes to a database cluster 332 or individual database(s) 424 and 426, for example. While this may reduce contention and latency, limitations of single-threaded databases may still remain. Such limitations may be mitigated where multiple databases are available, with added advantages when the multiple single-threaded databases are in a distributed database cluster. Single-threaded databases may be used where multi-threaded operation is deactivated, impossible, or otherwise unavailable.

To mitigate and/or solve the above problems identified above, another solution is provided by way of example in this embodiment. Referring to FIG. 5, clustered system 500 may include applications App1-AppN 502-508, storage layer 510, output data 512-518, and listener 520, and each may work in the same manner as corresponding elements 302-320 from FIG. 3 and/or 402-420 from FIG. 4. Database cluster 534 with nodes Node1-NodeK 536-542 may be provided in a configuration similar to that of database cluster 332 and its respective nodes Node1-NodeK 324-330 as shown in FIG. 3. In some embodiments, each node of Node1-NodeK 536-542 may be a separate database.

In some additional embodiments of alternative system 500, there may be an additional module illustrated here as a "listener" 520 attached to the storage layer 510. Listener 520 may periodically "listen" for new data or files, actively polling for new changes based on triggering events, schedules, or similar constructs, which constitute an update policy. In some embodiments, such listening may be carried out by periodically fetching or listing the contents of a filesystem, monitoring snapshot (copy-on-write, journal, delta, etc.) listings or status information, or querying an object-storage API, or executing system calls, to name a few non-limiting, non-exhaustive examples in some embodiments. In certain other embodiments, the listener 520 may passively wait for specific signals, system calls, (file) system notifications, etc., or any combination thereof. In some embodiments, passive or periodic actions may be performed by lambda functions (lambda calculus), functional programming (function-level programming), meta-programming, multi-stage programming, multi-paradigm programming, etc. Such programming may have the added effect of saving additional resources overall and being able to be offloaded to cloud-based or other off-site and/or third-party services.

The latter techniques of the certain other embodiments may not be available on all systems or databases, but may, where available, increase or decrease overall efficiency of the storage layer 510, listener 520, and/or mass-insertion module 422, depending on average fill rate of the storage layer 510 (or particular outputs or objects therein), processing overhead of the listener 520, and/or processing overhead of mass-insertion operations performed by the intermediate module such as computer cluster 522. While fill rates and average fill rate pertaining to the storage layer 510 may depend on external factors of the applications and any of their users, data sources, and any expected output, processing overhead of listener 520 and computer cluster 522 may also depend on implementation details intrinsic to each.

For case of illustration, this exemplary embodiment of FIG. 5 shows one database cluster, but in practice, any number of databases or database clusters may be deployed and used in the same manner as shown here. In embodiments having multiple database clusters, for example, a user may access one of the clusters while another cluster may be simultaneously updated via the computer cluster 522. Thus, in such embodiments, multiple database clusters may be operated in a manner similar to that of the multiple databases of system 200 in FIG. 2 and system 400 in FIG. 4.

In some embodiments, each database (cluster) and/or node may be configured to store its data entries as key-value pairs. Additionally, in some embodiments, Node1-NodeK 536-542 in database cluster 534 may be further configured in a distributed and/or partitioned schema, such that each node is configured to store only values corresponding to keys having a certain hash, in order to provide easy search and access of database entries, in each node and across a given database cluster. This arrangement may be referred to as slot partitioning or hash-bucket indexing, in some further embodiments. Each node would have a substantially equal number of hashes, in some embodiments. For example, for quantity K nodes and quantity Z possible hashes or hashtable slots (hash buckets or partitions), each node would have approximately $Z \times K^{-1}$ slots ($K^{-1}$ or 1/K of the total possible slots, for Z/K actual slots) assigned to it, in some embodiments, allowing for rounding, platform-specific tolerances, etc.

Moreover, compared with mass-insertion modules 322 and 422, each serving as intermediate modules in FIGS. 3 and 4, respectively, computer cluster 522 may be used for the same purpose of mass insertion of data entries into the database cluster 534. Unlike the mass-insertion modules 322 and 422, which may be unable to perform mass insertions in a distributed manner on database clusters of single-threaded database nodes, a cluster such as computer cluster 522 may be configured to ensure quick and reliable distributed mass-insertion operations in single-threaded database clusters such as database cluster 534.

To this end, computer cluster 522 may be organized and operated according to a framework and/or platform suitable for clustered computing and/or storage, including Hadoop, Spark, Storm, Flume, Oozie, YARN, HPCC, Impala, etc., to name a few non-limiting examples. Under any implementation, the computer cluster 522 may have at least one node that serves as a driver 524 (also referred to as a master, in some embodiments), which in turn may interface with at least one other node in the computer cluster 522. Such a node may serve as an executor, such as, e.g., Executor1-ExecutorM 526-532 (also referred to as slaves, in some embodiments).

A benefit of using executors in a computer cluster 522 associated with database nodes in a database cluster 534 is that the executors, in these embodiments, may bypass the single-threaded database cluster interface, which would block all nodes if any node is being written. If each executor may have a direct line to each or any database node in the database cluster 534, then the plurality of nodes in the database cluster may effectively be accessed and written in parallel with each other, in accordance with smart logic driving the executors to access the database cluster 534 efficiently without actually multi-threading the database cluster (without multi-threaded operation of the database nodes in the database cluster) 7.

In an embodiment, computer cluster 522, by way of driver 524, may receive new data entries, such as via listener 520. Driver 524 then may, according to an algorithm or rule(s), distribute at least one entry of data (or an object, in some embodiments that may use object storage at the storage layer 510), such as any of output data Out1-OutN 512-518 output by applications App1-AppN 502-508 stored in storage layer 510. In an example embodiment, the data stored in storage layer 510 may include data entries, which may further include or which may themselves be key-value pairs. For a given key-value pair, a computer (any computer, inside or outside of computer cluster 522, including driver 524) may calculate a hash of the key and send the key-value pair to an executor of Executor1-ExecutorM 526-532 associated with a corresponding node of Node1-NodeK 536-542 according to the value of the hash calculated for the key, where the hash calculated for the key falls within a range of hashes assigned to the corresponding node, in some embodiments. In some embodiments, each key may reside on only one database node (not counting backup or spare nodes).

Each node in the database cluster, e.g., Node1-NodeK 536-542 in database cluster 534, may be accessed by an executor, e.g., one of Executor1-ExecutorM 526-532, configured to perform a mass-insertion operation on the corresponding node associated with the corresponding executor. In some embodiments, each executor may perform mass-insertion operations on at least one database node in the database cluster 534, but each node may receive data from only one associated executor. This may prevent contention problems while maintaining efficiency of provisioning the computer cluster 522, in some embodiments.

In an exemplary embodiment, the database nodes of the database cluster 534 are of quantity K, and the executor nodes (executors/slaves) of the computer cluster 522 are of quantity M, where M may be less than or equal to K according to a desired tradeoff of provisioning to performance (M≤K). However, if M is decreased with respect to K, then the benefit of the computer cluster 522 may be diminished for each relatively smaller value of M. If M=1, then the new clustered system 500 of FIG. 5 would be functionally equivalent to the alternative system 300 of FIG. 3. If M=K, then mass-insertion operations may be performed on all database nodes in the database cluster 534 simultaneously in a parallel, distributed fashion. Given this parallelized execution of mass-insertion operations in single-threaded database clusters, dramatic increases in speed may be achieved, which may advantageously enhance overall performance and/or which may at least avoid unacceptable system failures.

In an embodiment, if M were greater than K, then there would be at least one executor node in the computer cluster 522 that may always be idle with respect to database cluster 534. However, in each cluster (computer cluster 522 and database cluster 534), there may be overprovisioned or redundant (spare) nodes that may not be visible to any outside element interfacing with a given cluster. Such overprovisioned or redundant nodes may be mirrored, replicated, or otherwise quickly recoverable hot spares to be used as fail-safe measures to ensure reliable operation and availability of cluster resources. In any case, numbers of overprovisioned or redundant (spare) nodes are not factored into the counts of quantity K and quantity M, for illustrative purposes of FIG. 5.

By using a computer cluster 522 as an intermediate module between database cluster 534 and listener 520, a clustered system 500 may realize benefits of easier scalability, quantity K of database nodes may grow faster than quantity M of executors (M≤K), although quantity M may also be scaled up eventually to meet demand from growing quantity K, in some embodiments. Additionally, computer clusters such as computer cluster 522 may enhance systems with the flexibility of their inherent distributed nature, for example, as any executor may be repurposed from performing mass-insertion operations in one database node to performing mass-insertion operations in at least one other database node. Additionally, on account of this flexibility, the new clustered system 500 may realize further advantages of fault-tolerance and resiliency: if an executor node fails during a mass-insertion write operation, a spare or different executor node may be brought online in order to continue the process smoothly.

One example use case of a system such as the new clustered system 500 depicted in FIG. 5 would be to apply in a real-world scenario of managing storage of user-specific recommendations of streaming content for users of a streaming media subscription service. For example, a streaming media content player device may comprise, execute, and run at least one application at a given time for a given user. The streaming media subscription service may have a vast network comprising hundreds of millions of users, each using at least one content player device, each running at least one application. Each application may generate at least one content recommendation for a specific user, at varying time intervals, sometimes every second or more frequently, such as when a user is browsing a large list of content options or when a user is consuming certain parts of certain other content titles. It should be understood that this disclosure is not limited to this example use case.

Content recommendations may be relatively small data entries, in some embodiments. In order to conserve data that must be transmitted and/or stored, a user-specific content recommendation may be a key-value pair made up of a key, such as a unique user ID, and a value, being at least a unique identifier of a content title. In some embodiments, the content recommendation may be a data structure containing more metadata relating to the recommended content title. Otherwise, the unique identifier of a content title may be used by itself to reference more information about the recommended content title. These recommendations may need to be stored, at least so that they may be analyzed for trends over time and across varying groups of users, and so that they may be fed back into future content recommendations, in some embodiments. As such, real-time concurrency of data may not be as important as simply ensuring that the content recommendation data are eventually written into storage in relatively short order, without overwhelming system resource capacity.

Even if a content recommendation may use only a small amount of data for transmission and storage, there may be immense quantities of content recommendations generated in relatively short periods of time, for example, many billions of recommendations per second at certain times. Systems using single-threaded clusters would typically buckle under this type of load, failing quickly. Even the improved alternative system 300 of FIG. 3 may not always be able to overcome the performance bottleneck that may result from the single intermediate module performing mass-insertion operations, in some circumstances. The system 400 of FIG. 4 may be able to handle the load depending on resources available to it, although scalability may be limited by cost in some circumstances, as the resources required to scale to accommodate such a high volume would be nearly linear in configurations such as those of FIG. 4, which may become unsustainable to keep scaling up. However, clustered system 500, provisioning modest but sufficient resources, may be able to handle these types of modern high-volume workloads at little to no incremental overhead and marginal cost, at least in terms of latency, availability, and reliability.

Figure 6:
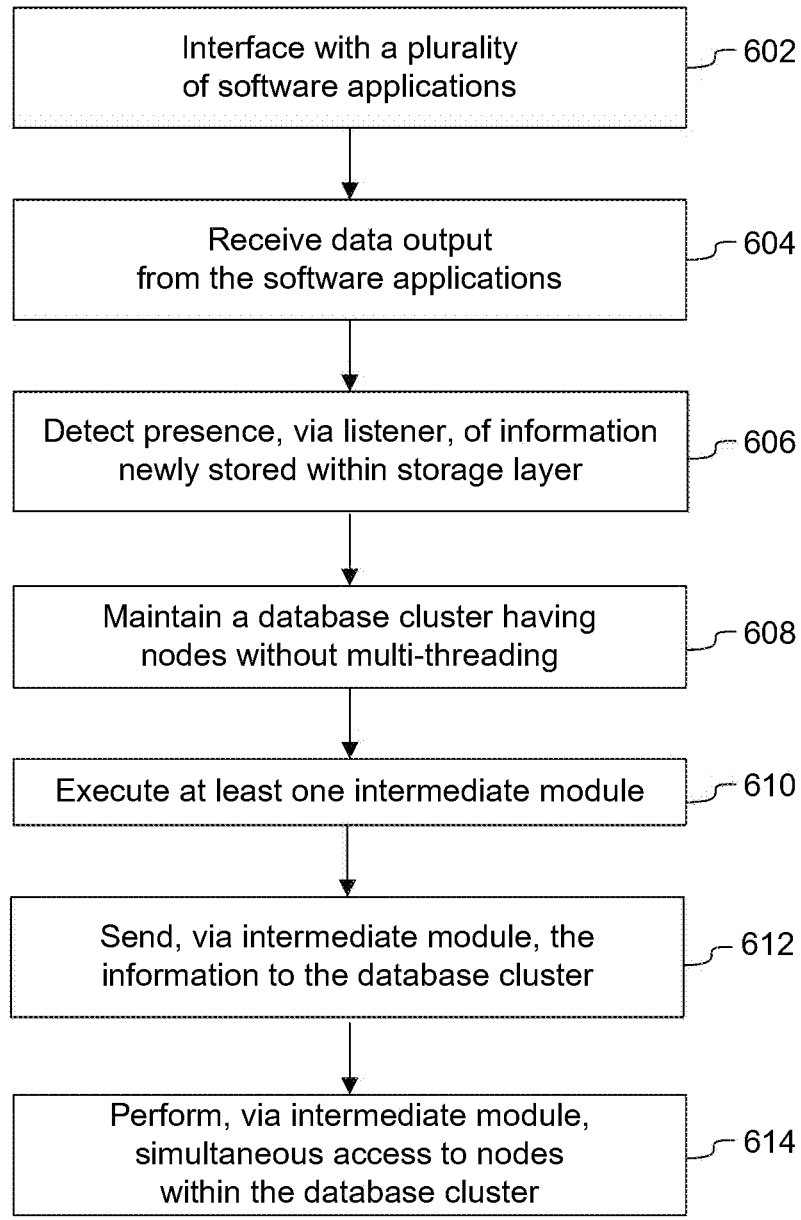
FIG. 6 illustrates a flowchart representing a mass-insertion operation for single-threaded database clusters, according to some embodiments.

FIG. 6 illustrates a flowchart representing a mass-insertion operation for single-threaded database clusters, according to some embodiments.

Process 600 may be performed by processing logic that may include hardware (e.g., circuitry, dedicated logic, programmable logic, microcode, etc.), software (e.g., instructions executing on a processing device), or any combination thereof.

It is to be appreciated that not all steps may be needed to perform the disclosure provided herein. Further, some of the steps may be performed simultaneously, or in a different order than shown in FIG. 6, as will be understood by a person of ordinary skill in the art.

At 602, a processor such as processor 704 may be configured to interface with a plurality of software applications, such as App1-AppN 502-508. For example, in an embodiment, a system may standardize on an application programming interface (API), based on which, various software applications, potentially including third-party software applications, may communicate with the system powered by the processor 704. Additionally, in some embodiments, the system may be entirely automated, not requiring any regular intervention from users or administrators.

At 604, processor 704 may receive data output from the software applications, such as Out1-OutN 512-518, each respectively corresponding to App1-AppN 502-508. Depending on the nature of each application and the size, volume, and frequency with which it issues data output, resources required may vary. In some illustrative, non-limiting embodiments such as those described above, the plurality of software applications may collectively generate many billions of data entries at a time, such as for streaming media content recommendations.

At 606, processor 704 may detect a presence, via a listener, such as listener 520, of information newly stored within storage layer. This detection may not necessarily always be happening in a system that embodies these elements disclosed herein. However, when certain patterns are detected, then additional steps may be taken, such as for information security, efficiency of access, constraints on time and/or memory space. If no new information is detected in a given monitoring area, then execution may default to actions related to 608 below, of maintaining a database cluster, for example. Other incidental functions may be defined. If new information is detected by our system, then execution may proceed to 610, as explained below.

At 608, processor 704 may be further used to maintain at least one database cluster, wherein nodes have multi-threaded execution properties, in some embodiments. In some embodiments, it may be just a small number, as low as two, of single-threaded database nodes running in a cluster, such that benefits of this description may be realized. From here, execution may return to at least either of 604 or 606, depending on available data to monitor.

At 610, if it is determined that new information is present in an area to be monitored, e.g., a storage layer such as storage layer 510, processor 704 may then execute an intermediate module, such as computer cluster 522. Alternatively, in some embodiments, a less complex application may be used as an intermediate module 522, such as a mass-insertion module 422, to perform mass-insertion operations in a database cluster of single-threaded databases. Execution of this intermediate module may be triggered by relaying or sending at least some of this information to it, in some embodiments. Execution may then pass to 612.

At 612, the intermediate module may send at least some of the new information to a database cluster, such as database cluster 534. In order to do this efficiently, various techniques may be used, of varying complexity. The least complex embodiments may attempt simple writes to the cluster, in some embodiments, but these such writes often fail without other ways of managing contention, sequential input/output (I/O) delays, etc. Thus, execution may then pass to 614.

At 614, processor 704 may then perform, via the intermediate module, simultaneous access to nodes within the database cluster. This action may also be referred to as a mass insertion. Depending on the structure of each of the database cluster and the intermediate module, e.g., as computer cluster 522, such simultaneous access may be improved by using a plurality of executor nodes Executor1-ExecutorM 526-532, as described with respect to FIG. 5 above.

Process 600 is disclosed in the order shown above in this exemplary embodiment of FIG. 6. In practice, however, the operations disclosed above, alongside other operations, may be executed sequentially in any order, or they may alternatively be executed concurrently, with more than one operation being performed simultaneously, or any combination of the above.

Example Computer System

Figure 7:
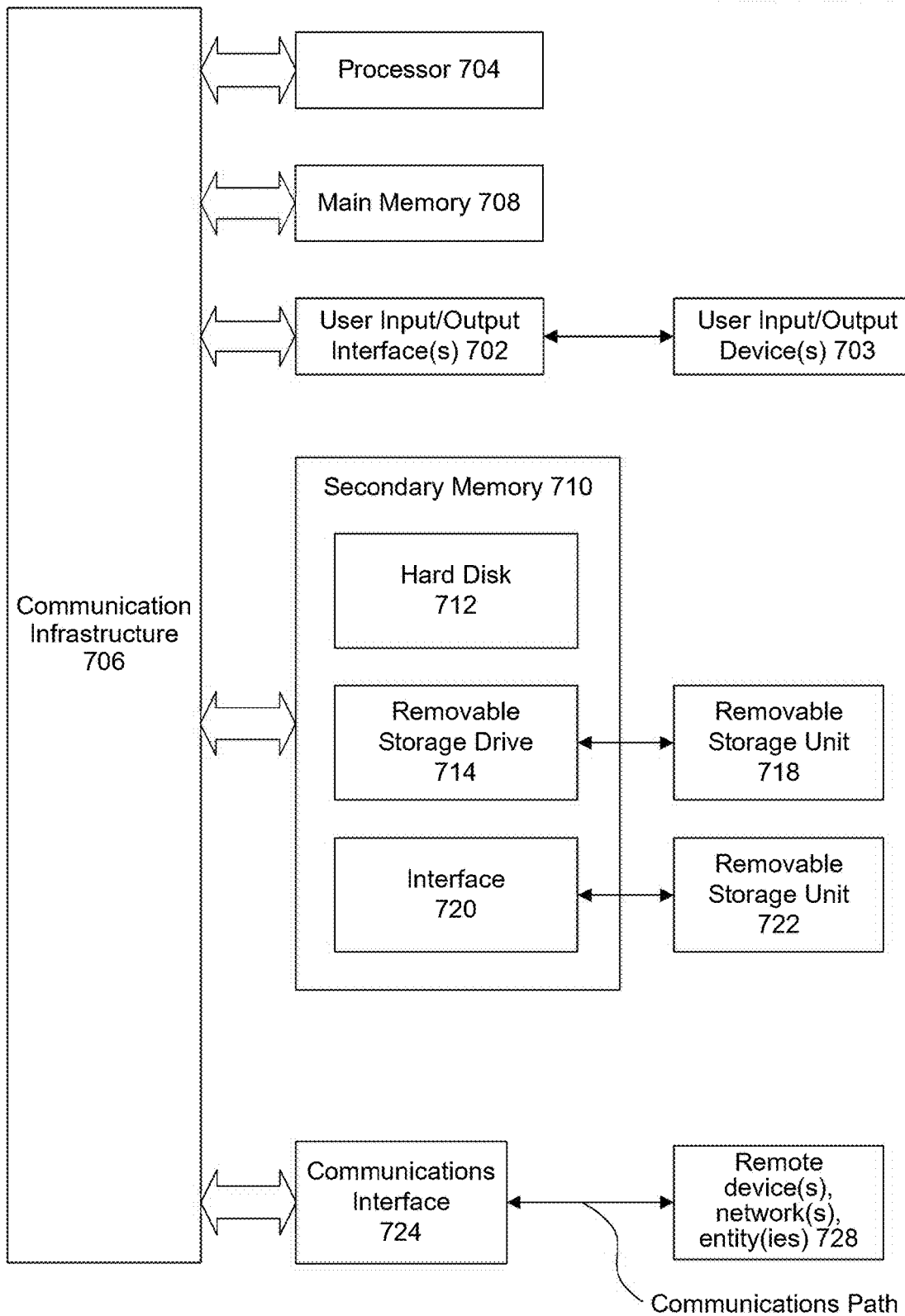
FIG. 7 illustrates an example computer system useful for implementing various embodiments.

Various embodiments and/or components therein may be implemented, for example, using one or more computer systems, such as computer system 700 shown in FIG. 7. Computer system 700 may be any computer or computing device capable of performing the functions described herein. For example, one or more computer systems 700 may be used to implement any embodiments of FIGS. 1-6, and/or any combination or sub-combination thereof.

It should be appreciated that the system frameworks described herein may be implemented as a method, process, apparatus, or article of manufacture such as a non-transitory computer-readable medium or device. For illustration purposes, the present system frameworks may be described in the context of database clusters. It should be appreciated, however, that the present framework may also be applied in processing other types of cluster computing that may perform batch operations on single-threaded nodes of other clusters.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

The data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML7 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any scripting or programming language, procedural, functional, or object-oriented, and may be assembled, compiled, or interpreted. Non-limiting examples include C, C++, C#, Objective-C, Java, Swift, Go, Ruby, Rust, Perl, Python, JavaScript, WebAssembly, or virtually any other language, with any other libraries or schemas, in any kind of framework, runtime environment, virtual machine, interpreter, shell, stack, engine, or similar mechanism, including but not limited to Node.js, jQuery, Dojo, Dijit, OpenUI7, AngularJS, Express.js, Backbone.js, Ember.js, DHTMLX, React, Chakra, SpiderMonkey, V8, Electron, XULRunner, WebRunner, WebEngine, Prism, AIR, Blink, CEF, Cordova, among many other non-limiting examples.

Embodiments disclosed herein may be implemented and/or performed with any database framework, regardless of capabilities for single- or multi-threaded operation, including well-known examples of database implementations such as Redis, SSDB, LevelDB, Bigtable, Bluefish, Cassandra, Hypertable, HyperDex, Coord, Druid, Accumulo, HBase, Ignite, Tarantool, Actord, Memcached, MemcacheQ, Repcached, JBoss Cache, Infinispan, Coherence, Hazelcast, Voldemort, Scalaris, Riak, KAI, KDI, Acrospike, ArangoDB, Berkeley DB, Cosmos DB, CouchDB, DocumentDB, DovetailDB, DynamoDB, FoundationDB, InfinityDB, LMDB, MemcacheDB, MongoDB, NMDB, ObjectivityDB, OrientDB, QuasarDB, RethinkDB, RocksDB, SimpleDB, ZopeDB, Mnesia, River, Virtuoso, Domino, eXtreme Scale, Clusterpoint, Couchbase, Perst, Qizx, MarkLogic, HSQLDB, H2, Dynomite, Shoal, GigaSpaces, OpenNeptune, DB4O, SchemaFree, RAMCloud, Keyspace, Flare, Luxio, MUMPS, Neo4J, Lightcloud, Cloudscape, Derby, Giraph, TokyoTyrant, c-TreeACE, InfiniteGraph, generic implementations of XML databases or dbm-compatible databases, or any other NoSQL database variant, for example. This would not rule out any compatible SQL-like implementations, such as NewSQL architectures including MemSQL, NuoDB, VoltDB, Spanner, Gridgain, Trafodion, Clustrix, or other related solutions including MySQL Cluster, InnoDB, InfiniDB, TokuDB, MyRocks, Infobright, Vitess, Scalebase, and others. Other traditional SQL-based implementations such as Postgres (PostgreSQL), MariaDB, MySQL, DB2, MS-SQL, SQL Server, SQLite, and other relational databases may be adapted to benefit from techniques described herein. Other benefits realized from the techniques described herein apply particularly well to big data on cluster-based platforms including Hadoop, HFS, GFS, HPCC, Sector, Sphere, Mahout, etc.

Computer system 700 includes one or more processors (also called central processing units, or CPUs), such as a processor 704. Processor 704 is connected to a bus or communication infrastructure 706.

Computer system 700 also includes user input/output device(s) 703, such as monitors, keyboards, pointing devices, etc., which communicate with communication infrastructure 706 through user input/output interface(s) 702.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes a primary memory or main memory 708, such as random access memory (RAM). Main memory 708 may include one or more levels of cache. Main memory 708 has stored therein control logic (i.e., computer software) and/or data.

Computer system 700 may also include one or more secondary storage devices or secondary memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a network interface or communication interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LAN, WANs, the Internet, etc. Control logic and/or data may be transmitted to and from computer system 700 via communications path 726.

A computer system may also be any one of a personal digital assistant (PDA), desktop workstation, laptop or notebook computer, netbook, tablet, smart phone, smart watch, or embedded system, to name a few non-limiting examples.

Any such computer system 700 may run any type of application associated with a layered repository facility, including legacy applications, new applications, etc.

Computer system 700 may be a client or server, accessing or hosting any applications through any delivery paradigm, including but not limited to remote or distributed cloud computing solutions; local or on-premises software ("on-premise" cloud-based solutions); "as a service" models, e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), or infrastructure as a service (IaaS); or a hybrid model including any combination of the foregoing examples or other comparable services or delivery paradigms.

In an embodiment, a non-transitory, tangible apparatus or article of manufacture comprising a tangible, non-transitory computer-useable or computer-readable device or medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the configuration provider for layered repository using data processing devices, computer systems and/or computer architectures other than that shown in FIG. 7. In particular, embodiments may operate with software, hardware, and/or operating system implementations other than those described herein.

By way of another example, the computer system 700 may include, but is not limited to, a mobile phone or other mobile device, a personal digital assistant (PDA), a computer, a cluster of computers, a set-top box, a smart watch, a smart phone, a tablet, VR/AR headset or helmet, or other types of device capable of processing instructions and receiving and transmitting data to and from humans and other computing devices.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Conclusion

It is to be appreciated that the Detailed Description section, and not the Summary and Abstract sections, is intended to be used to interpret the claims. The Summary and Abstract sections may set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases may not necessarily be referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
    at least one processor;
    at least one storage layer configured to interface with a plurality of software applications and to receive data output from the plurality of software applications;
    at least one listener configured to detect a presence of a data entry newly stored within the at least one storage layer, wherein the data entry comprises at least a key and a value in a key-value pair corresponding to the data entry; and
    a memory operatively coupled to the at least one processor, the at least one processor configured to perform operations comprising:
        sending the key-value pair to a computer cluster, wherein the computer cluster comprises a master node interfacing with a plurality of slave nodes, each slave node of the plurality of slave nodes assigned to a corresponding database node based on a hash value of the key of the key-value pair being unique to the corresponding database node, and wherein each of the corresponding database nodes is configured to run as a single-threaded database; and
        performing at least one mass insertion of the data entry from the at least one storage layer by simultaneous access and storage of the data entry to at least two of a plurality of the corresponding database nodes.

2. The system of claim 1, wherein the hash value of the key is within a range of hashes assigned to the corresponding database node.

3. The system of claim 1, the operations further comprising performing the at least one mass-insertion across the plurality of corresponding database nodes, for a quantity of the plurality of corresponding database nodes equal to a corresponding quantity of the plurality of slave nodes.

4. The system of claim 3, wherein the quantity of the plurality of corresponding database nodes and the corresponding quantity of the plurality of slave nodes excludes overprovisioned nodes corresponding to the plurality of corresponding database nodes or to the plurality of slave nodes.

5. The system of claim 1, the operations further comprising generating or updating at least one content recommendation based at least in part on the key-value pair.

6. The system of claim 1, wherein a function of the at least one listener comprises a wait state and a lambda function.

7. The system of claim 1, wherein the at least one storage layer comprises object storage, and wherein the object storage comprises distributed objects in a unified namespace.

8. A computer-implemented method, comprising:
   interfacing, via at least one processor, with at least one storage layer to receive data output from a plurality of software applications;
   detecting, via at least one listener, a presence of a data entry newly stored within the at least one storage layer, wherein the data entry comprises at least a key and a value in a key-value pair corresponding to the data entry;
   sending the key-value pair to a computer cluster, wherein the computer cluster comprises a master node interfacing with a plurality of slave nodes, each slave node of the plurality of slave nodes assigned to a corresponding database node based on a hash value of the key of the key-value pair being unique to the corresponding database node, and wherein each of the corresponding database nodes is configured to run as a single-threaded database; and
   performing at least one mass insertion of the data entry from the at least one storage layer by simultaneous access and storage of the data entry to at least two of a plurality of the corresponding database nodes.

9. The computer-implemented method of claim 8, further comprising performing a mass-insertion across the plurality of corresponding database nodes, for a quantity of the plurality of corresponding database nodes equal to a corresponding quantity of the plurality of slave nodes.

10. The computer-implemented method of claim 9, wherein the quantity of the plurality of corresponding database nodes and the corresponding quantity of the plurality of slave nodes excludes overprovisioned nodes corresponding to the plurality of corresponding database nodes or to the plurality of slave nodes.

11. The computer-implemented method of claim 8, further comprising generating or updating at least one content recommendation based at least in part on the key-value pair.

12. The computer-implemented method of claim 8, wherein the at least one listener comprises a wait state and a lambda function.

13. The computer-implemented method of claim 8, wherein the at least one storage layer comprises object storage, and wherein the object storage comprises distributed objects in a unified namespace.

14. A non-transitory computer-readable medium having instructions stored thereon that, when executed by at least one computer processor, cause the at least one computer processor to perform operations comprising:
   interfacing, via the at least one computer processor, with at least one storage layer to receive data output from a plurality of software applications;
   detecting, via at least one listener, a presence of a data entry newly stored within the at least one storage layer, wherein the data entry comprises at least a key and a value in a key-value pair corresponding to the data entry;
   sending the key-value pair to a computer cluster, wherein the computer cluster comprises a master node interfacing with a plurality of slave nodes, each slave node of the plurality of slave nodes assigned to a corresponding database node based on a hash value of the key of the key-value pair being unique to the corresponding database node, and wherein each of the corresponding database nodes is configured to run as a single-threaded database; and
   performing at least one mass insertion of the data entry from the at least one storage layer by simultaneous access and storage of the data entry to at least two of a plurality of the corresponding database nodes.

15. The non-transitory computer-readable medium of claim 14, the operations further comprising performing a mass-insertion across the plurality of corresponding database nodes, for a quantity of the plurality of corresponding database nodes equal to a corresponding quantity of the plurality of slave nodes.

16. The non-transitory computer-readable medium of claim 15, wherein the quantity of the plurality of corresponding database nodes and the corresponding quantity of the plurality of slave nodes excludes overprovisioned nodes corresponding to the plurality of corresponding database nodes or to the plurality of slave nodes.

17. The non-transitory computer-readable medium of claim 14, the operations further comprising generating or updating at least one content recommendation based at least in part on the key-value pair.

18. The non-transitory computer-readable medium of claim 14, wherein the detecting comprises a wait state and a lambda function.

19. The non-transitory computer-readable medium of claim 14, wherein the at least one storage layer comprises object storage, and wherein the object storage comprises distributed objects in a unified namespace.

20. The non-transitory computer-readable medium of claim 14, the operations further comprising updating at least one state indicator for a shared resource among the plurality of corresponding database nodes.

* * * * *